United States Patent
Kang et al.

(10) Patent No.: US 11,561,012 B2
(45) Date of Patent: Jan. 24, 2023

(54) PUMP ASSEMBLY AND COOKING APPLIANCE WITH PUMP ASSEMBLY

(71) Applicant: LG ELECTRONICS INC., Seoul (KR)

(72) Inventors: Chung Kang, Seoul (KR); Ugjin Kim, Seoul (KR); Dae Yong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 617 days.

(21) Appl. No.: 16/519,309

(22) Filed: Jul. 23, 2019

(65) Prior Publication Data

US 2020/0033010 A1    Jan. 30, 2020

(30) Foreign Application Priority Data

Jul. 26, 2018  (KR) .................. 10-2018-0087443

(51) Int. Cl.
  *F24C 15/32*   (2006.01)
  *F04B 53/22*   (2006.01)
  *F04B 37/12*   (2006.01)
  *F04B 53/00*   (2006.01)
  *F04B 43/02*   (2006.01)
  *F04B 53/16*   (2006.01)
  *F04B 39/12*   (2006.01)
  *F04B 37/10*   (2006.01)
  (Continued)

(52) U.S. Cl.
  CPC ............ *F24C 15/327* (2013.01); *F04B 37/10* (2013.01); *F04B 39/12* (2013.01); *F04B 39/14* (2013.01); *F04B 43/02* (2013.01); *F04B 53/003* (2013.01); *F04B 53/16* (2013.01); *F04B 53/22* (2013.01); *A47J 36/00* (2013.01)

(58) Field of Classification Search
  CPC ...... F04B 53/003; F04B 53/004; F04B 53/16; F04B 53/22; F04B 37/10; F04B 39/12; F04B 39/14; F04B 43/02; A47J 36/00; F24C 15/327
  USPC .................................................. 417/363, 417
  See application file for complete search history.

(56) References Cited

U.S. PATENT DOCUMENTS 4,079,436 A * 3/1978 Brown ..................... H02H 7/12
                                                     361/91.6
7,329,104 B2   2/2008 Kenney
                       (Continued)

FOREIGN PATENT DOCUMENTS

EP          2775216 A2 * 10/2014
WO    WO 2008/025217     3/2008

OTHER PUBLICATIONS

European Search Report dated Nov. 19, 2019 issued in Application No. 19187740.6.
(Continued)

*Primary Examiner* — Charles G Freay
(74) *Attorney, Agent, or Firm* — KED & Associates

(57) ABSTRACT

A pump assembly and a cooking appliance having a pump assembly are provided. The pump assembly may include a cavity that defines a cooking cavity; a water supplier installed outside of the cavity; a connection pipe connected to the water supplier; and a pump assembly disposed outside of the cavity and connected to the connection pipe. The pump assembly may includes at least one pump; and a support made of a flexible material and coupling the at least one pump to an upper surface of the cavity.

19 Claims, 12 Drawing Sheets

(51) Int. Cl.
*F04B 39/14* (2006.01)
*A47J 36/00* (2006.01)

(56) References Cited

U.S. PATENT DOCUMENTS

| | | | | |
|---|---|---|---|---|
| 8,182,243 | B2* | 5/2012 | Ward | F04B 49/06 |
| | | | | 310/34 |
| 2008/0267798 | A1* | 10/2008 | Liu | F04B 49/06 |
| | | | | 417/416 |
| 2009/0250452 | A1* | 10/2009 | Tse | F24C 15/327 |
| | | | | 219/400 |
| 2012/0207629 | A1 | 8/2012 | Kotsiopoulos | |
| 2013/0129535 | A1 | 5/2013 | Schmid et al. | |
| 2014/0144942 | A1 | 5/2014 | Ganzer | |
| 2016/0108909 | A1* | 4/2016 | Fochtman | F04B 23/06 |
| | | | | 417/366 |
| 2019/0203944 | A1 | 7/2019 | Cho et al. | |

OTHER PUBLICATIONS

Horecatiger—Gastroiger GmbH: "bracket for vibration pump—Item No. 696786" Internet, Jan. 30, 20019, Retrieved from the Internet: URL: https://horecatiger.eu/en-eu/shop/bracket-for-vibration-pump-I-85mmw-45mm-h-70mm-696786 [retrieved on Jan. 11, 2021].
Horecatiger—Gastroiger GmbH: "vibration pump type 220/240V 70W 60Hz inlet Ø 6499142" Internet, Apr. 29, 2009, Retreived from the Internet: URL: https://horecatiger.eu/en-eu/shop/vibration-pump-type-220-240v-70w-60hz-inlet-6-499142 [retrieved on Jan. 11, 2021].
European Office Action dated Feb. 5, 2021 issued in Application No. 19187740.6.

\* cited by examiner

PUMP ASSEMBLY AND COOKING APPLIANCE WITH PUMP ASSEMBLY

CROSS-REFERENCE TO RELATED APPLICATION(S)

This application claims priority to and the benefit of Korean Patent Application No. 10-2018-0087443, filed in Korea on Jul. 26, 2018, the disclosure of which is incorporated herein by reference in its entirety.

BACKGROUND

1. Field

A pump assembly and a cooking appliance with pump assembly are disclosed herein.

2. Background

Cooking appliances may be used to cook food and may be installed in a kitchen space to cook food according to a user's intention. The cooking appliances may be classified in various ways according to, for example, heat sources used therein, forms thereof, and types of fuel.

In classification according to the forms in which food is cooked, cooking appliances may be classified as an open type cooking appliance and a closed type cooking appliance according to the form of space in which food is placed, Examples of the closed type cooking appliances may include an oven, a microwave, and the like, and examples of the open cooking appliances may include a cooktop, a hob, and the like.

The closed type cooking appliances may include a space that is configured to receive food and that is closed, and the closed space may be heated to cook food. The closed type cooking appliances may include a cooking chamber, which is a space being closed when food placed therein is attempted to be cooked. The cooking chamber may be a space in which food is substantially cooked.

The above closed type cooking appliance may be divided broadly into a gas oven and an electric oven depending on a type of heat source. The gas oven may use a method in which gas is used as a fuel and it is ignited by supplying the gas to a plurality of burners, and food is cooked by flame generated as the supplied gas is burned. The electric oven, unlike the gas oven, may use a method in which a plurality of heaters are operated using electricity as a heat source, and the food is cooked by the heat emitted from the heaters.

Electric ovens may be faster than gas ovens in a speed of cooking and may have high thermal efficiency, and may have good stability, and the use of electric ovens is increasing.

Such an electric oven may further provide a function for cooking food using high frequency by adding electric parts that emit the high frequency, such as magnetron, so that various types of food may be cooked, or for cooking food using a heat emitted by a heater and high frequency emitted by the electric parts such as the magnetron.

Recently, a steam oven that cooks food using high-temperature steam has been released. The steam oven may have a function for injecting steam into the cooking chamber using the high-temperature steam and controlling humidity based on an amount of steam. The steam oven may provide multiple functions, for example, for preventing the food from being dried and performing cooking a large amount of food with multi-steps, as well as preventing taste from being degraded and flavor from being evaporated to maintain the taste and the flavor of the food.

In general, the steam oven may include a cavity that defines a cooking chamber, a door that opens and closes a front opening of the cooking chamber, and a Steam generator that supplies steam to an inside of the cooking chamber.

Further, the Steam generator may include a steam generator that generates steam and a water tank or water source that supplies water to the steam generator. Between the water tank or water source and the steam generator, a connection pipe may be connected so that water in the water tank may be moved to the steam generator. The steam generator may include a water storage in which water supplied by a water tank/source is accommodated, and a heater that generates steam by heating water in the water storage.

In the above-described steam oven, the water injected from the water tank may flow into the water storage of the steam generator through the connection pipe, and the water introduced into the water storage of the steam generator may be heated by the heater of the steam generator to generate the steam, and the generated steam may be introduced into the cooking chamber and may be circulated through an inside of the cooking chamber, to cook the food using the steam.

In the Steam generator, a pump may be provided in a connection pipe between the water tank and the steam generator. The pump may function to pump water accommodated in the water tank to the connection pipe, and may be installed between the connection pipe connected to the water tank and the connection pipe connected to the steam generator.

Such a pump may have a property of severe vibration, so it is difficult to fix the pump onto the cavity. When the pump is fixed onto the cavity, noise may be greatly generated due to the vibration of the pump, and in severe cases, the pump or peripheral parts thereof may be broken.

In order to avoid such a problem, the pump may be installed with the front of the pump being fixed to the connection pipe connected to the water tank and the rear of the pump may be fixed to the connection pipe connected to the steam generator, that is, the pump may be fixed by the connection pipe forward and rearward.

However, when the pump is installed only by fixing the pump forward and rearward, the pump may rotate due to a rotational force of an impeller inside of the pump when the pump is operated. Further, when the pump is operated, the pump may oscillate due to the vibration of the pump itself. When such a phenomenon occurs, a collision may occur between the cavity or peripheral parts thereof and the pump, and a large amount of noise may be generated, and a risk of disengagement of the connection pipe from the pump may increase. Finally, this may result in a malfunction of the Steam generator.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments of a pump assembly and a cooking appliance that has the pump assembly according to the present disclosure will be described with reference to the accompanying drawings. For convenience of explanation, thicknesses of lines and sizes of components shown in the figures may be exaggerated for clarity and convenience of explanation. Further, terms described below are defined in consideration of functions of the present disclosure, which may vary depending on an intention or custom of users and operators. Therefore, definitions of these terms should be made based on the contents throughout the present disclosure.

<General Structure of Cooking Appliance>

Figure 1:
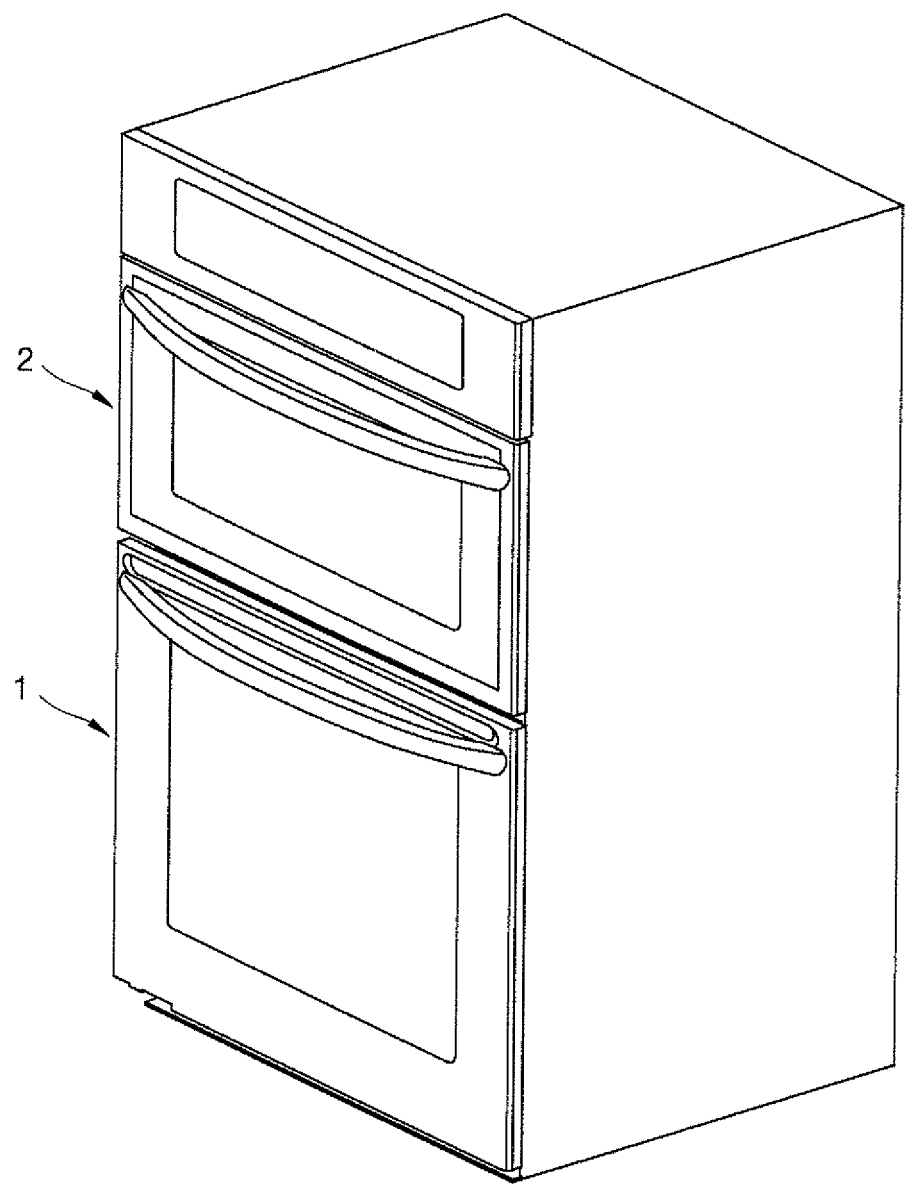
FIG. 1 is a perspective view of a cooking appliance according to an embodiment.
Figure 2:
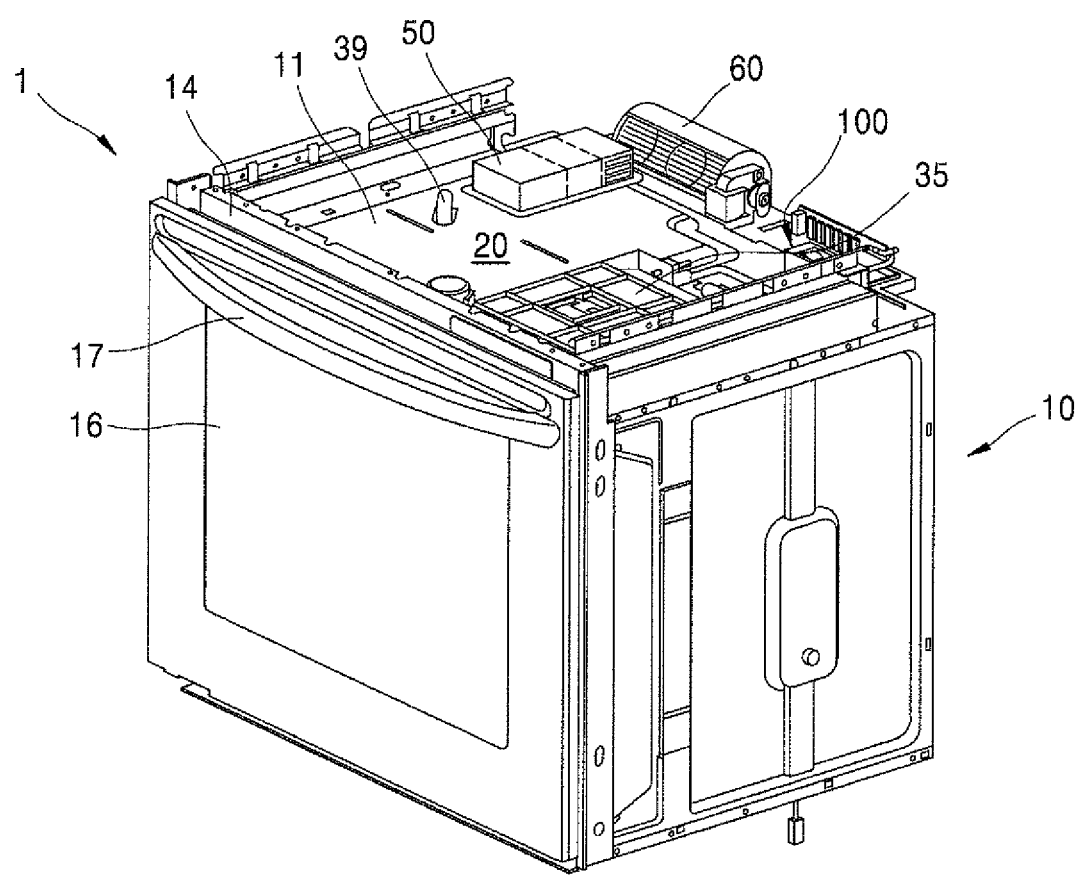
FIG. 2 is a perspective view of a separated portion of the cooking appliance shown in FIG. 1.
Figure 3:
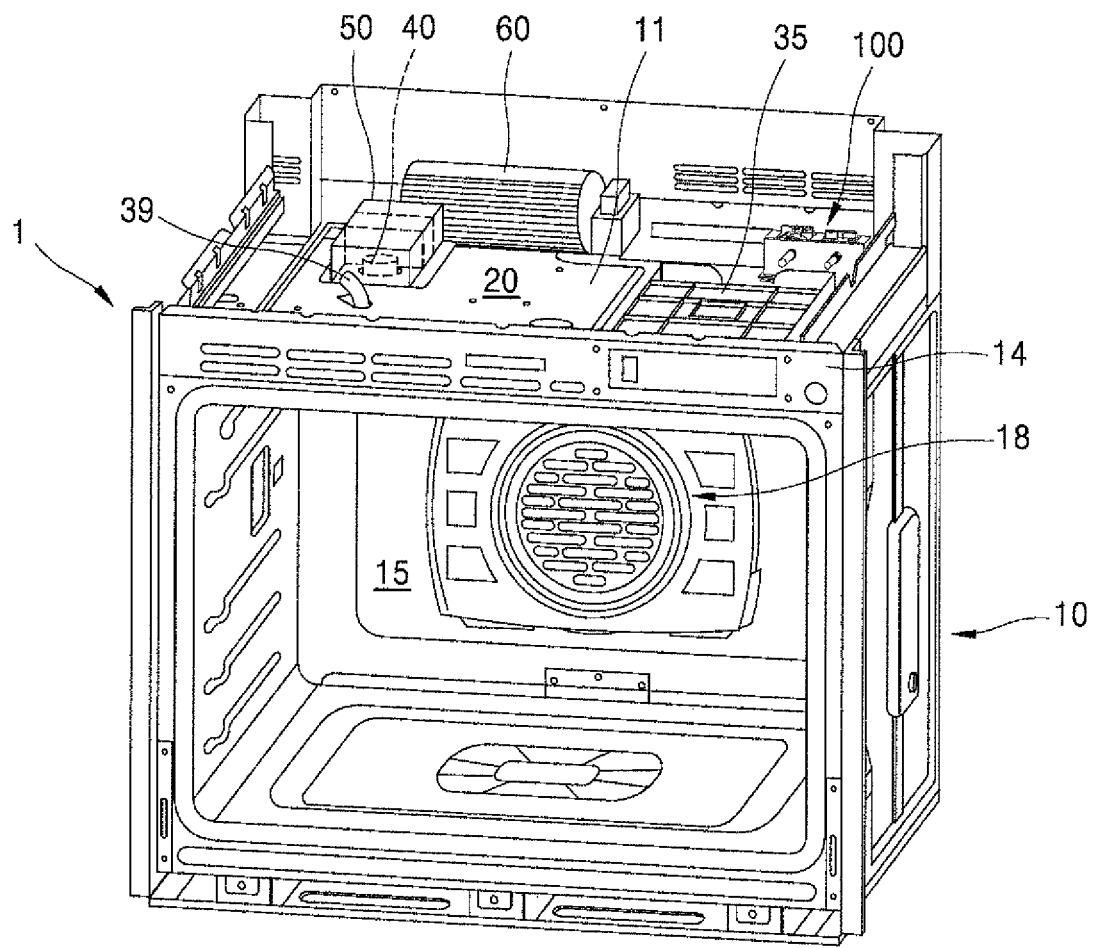
FIG. 3 is a perspective view of a state in which a door is removed from the cooking appliance shown in FIG. 2.

FIG. 1 is a perspective view of a cooking appliance according to an embodiment of the present disclosure. FIG. 2 is a perspective view of a separated portion of the cooking appliance shown in FIG. 1. FIG. 3 is a perspective view of a state in which a door is removed from the cooking appliance shown in FIG. 2.

Referring to FIG. 1, according to an embodiment of the present disclosure, a cooking appliance may include a first unit 1 disposed at a lower portion of the cooking appliance and a second unit 2 disposed at an upper portion of the cooking appliance.

In the present embodiment, both the first unit 1 and the second unit 2 are a closed type cooking appliance such as an electric oven, but the present disclosure is not limited thereto.

For example, the cooking appliance may be configured such that the first unit 1 disposed at the lower portion of the cooking appliance is an electric oven and the second unit 2 disposed at the upper portion of the cooking appliance is a gas oven.

As another example, a closed type cooking appliance other than an oven, such as a microwave oven, may be used for the second unit 2 and an open type cooking appliance, such as a cooktop, hops, grids may be used for the second unit 2 and may be disposed above the first unit 1.

Example of configurations of cooking appliance may include a case in which the first unit 1 and the second unit 2 are electric ovens, and is described below. A configuration of the cooking appliance, for example, a configuration of the first unit 1 is described.

Referring to FIGS. 1 and 2, an appearance of the first unit 1 is defined by a main body 10. The main body 10 may include a substantially rectangular parallelepiped shape and is made of a material having a predetermined strength to protect a plurality of parts installed in an inner space of the main body 10.

The main body 10 includes a cavity 11 that forms a skeleton of the main body 10 and a front plate 14 disposed forward of the cavity 11 and forms a front surface of the main body 10. A cooking chamber 15 is formed in the cavity 11 and an opening to open the cooking chamber 15 forward is formed in the front plate 14.

A cooking chamber 15 is formed inside of the main body 10. The cooking chamber 15 has a form of a hexahedron whose front surface is open. The cooking appliance heats an inner space of the cooking chamber 15 to cook food when the cooking chamber 15 is closed. That is, in the cooking appliance, food is substantially cooked in the internal space of the cooking chamber 15.

The cooking appliance has a heating device that heats the cooking chamber 15. As an example of such a heating device, a convection heater 18 that heats the internal space of the cooking chamber 15 by convecting hot air may be provided at a rear of the cooking chamber 15. An upper heater that heats the internal space of the cooking chamber 15 from above may be provided at an upper portion of the cooking chamber 11 as a heating device. Further, a lower heater that heats the inner space of the cooking chamber 15 from the lower portion may be provided at the lower portion of the cooking chamber 15 as a heating device.

A door 16 that selectively opens and closes the cooking chamber 15 is rotatably provided at the front side of the main body 10. The door 16 may open and close the cooking chamber 15 in a pull-down manner in which an upper end of the door 16 is vertically rotated about a lower end of the door 16.

The door 16 has a hexahedron shape having a substantially predetermined thickness. A handle 17 is installed at a front surface of the door 16 to be gripped by the user when the user rotates the door 16.

An electric chamber 20 to provide a space in which the electric parts are placed is formed above the main body 10, that is, a space between the first unit 1 and the second unit 2 that is stacked above the first unit 1. A lower interface of the electric chamber 20 may be defined by the upper surface of the cavity 11 and an upper interface of the electric chamber 20 may be defined by the lower surface of the second unit 2. The front surface of the electric chamber 20 may be closed by the front plate 14.

<Structure of Steam Supply Device>

Figure 4:
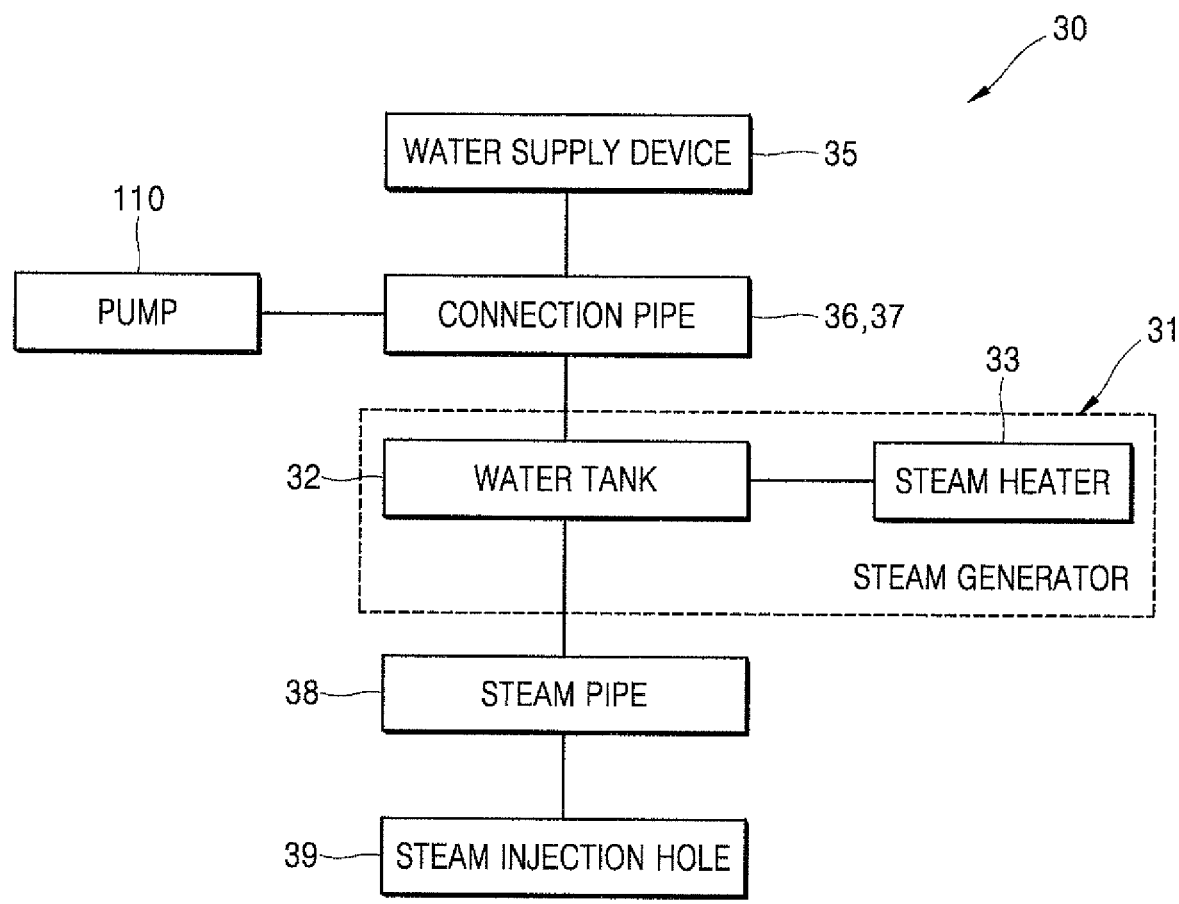
FIG. 4 is a configuration diagram of a configuration of a steam supply device according to an embodiment.
Figure 5:
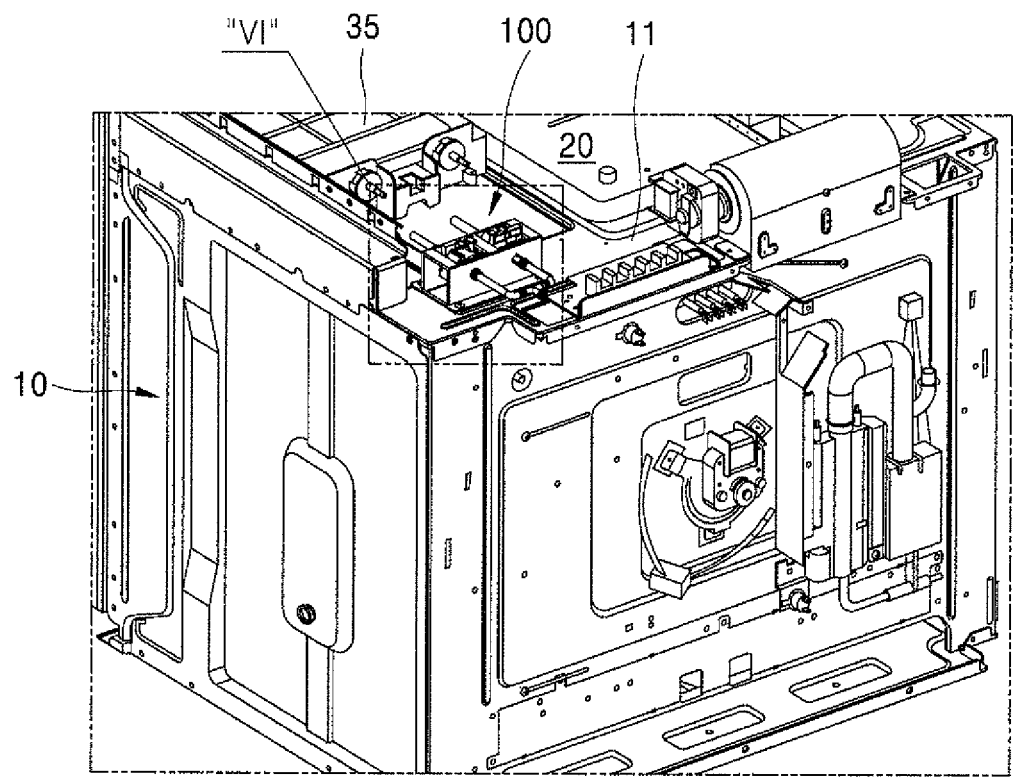
FIG. 5 is a rear perspective view of the cooking appliance shown in FIG. 2.

FIG. 4 is a configuration view of a configuration of a steam supply device according to an embodiment of the present disclosure. FIG. 5 is a rear perspective view of a cooking appliance shown in FIG. 2.

Referring to FIGS. 4 and 5, a steam supply device 30 may further be provided inside of a main body 10. The steam supply device 30 may be installed in the main body 10 and may supply steam to an inside of the cooking chamber 15 and may include a Steam generator 31, a water supply device 35, and connection pipes 36 and 37.

The Steam generator 31 is operated to generate steam by heating water. The Steam generator 31 includes a water tank 32 that accommodates water supplied from the water supply device 31 through the connection pipe 37 and a steam heater 33 that heats the water accommodated in the water tank 32 to generate steam.

The water supply device 35 is provided to store and supply water to be supplied to the Steam generator 31. In this embodiment, the water supply device 35 is installed in the electric chamber 20 formed above the cooking chamber 15, that is, above the main body 10. However, the present disclosure is not limited to thereto. The water supply device 35 may be installed at any selected position in which the water supply device 35 is less influenced by heat in the cooking chamber 15 at high temperatures and the water supply from an outside is easy, and the water supply from the Steam generator 31 is smoothly performed.

The connection pipes 36 and 37 connect the water supply device 35 and the Steam generator 31 so that a passage through which the water supplied by the water supply device 35 moves to the Steam generator 31 is formed. The connection pipes 36 and 37 may have a flexible tube form or a form of a pipe made of metal. Further, the connection pipes 36 and 37 may be connected to the Steam generator 31 by bypassing the cooking chamber 15 from the water supply device 35 and may be connected to the Steam generator 31 through a path bypassing to the rear side of the cooking chamber 15, and may be connected to the Steam generator 31 through a path bypassing to the side of the cooking chamber 15. All or some of the connection pipes 36 and 37 are omitted from FIGS. 2 and 3, and 6 and 7.

In the cooking appliance of the present embodiment having the above configuration, the water supplied by the water supply device 35 flows into the water tank 32 of the Steam generator 31 through the connection pipes 36 and 37 and the water introduced into the water tank 32 is heated by the steam heater 33 to generate the steam. The generated steam is introduced into the cooking chamber 15 via the steam pipe 38 and the steam injection hole 39 and circulates through an inside of the cooking chamber 15, to cook food using the steam.

At this time, the water supplied by the water supply device 35 may be supplied by a force generated by a height difference or a pressure difference between the water supply device 35 and the water tank 32, or by power of a pump 110 provided adjacent to the water tank 32 or the connection pipes 36 and 37. In this embodiment, the water supplied by the water supply device 35 is supplied by power of the pump 110 installed adjacent to the connection pipes 36 and 37.

Further, the steam supply device 30 may further include a steam injection member 39 (steam injection hole) that injects the steam generated by the Steam generator 31 into the cooking chamber 15. The steam injection member 39 is provided on the upper surface of the cavity 11 or any other suited location in the cavity (upper portion of side walls of the cavity) and is connected to the Steam generator 31 through the steam pipe 38. The steam injection member 39 forms a passage for injecting the steam generated by the Steam generator 31 downward into the cooking chamber 15 from the upper portion of the cooking chamber 15. The steam pipe 38 is omitted from FIGS. 2 and 3.

[Configuration of Pump Assembly]

Figure 6:
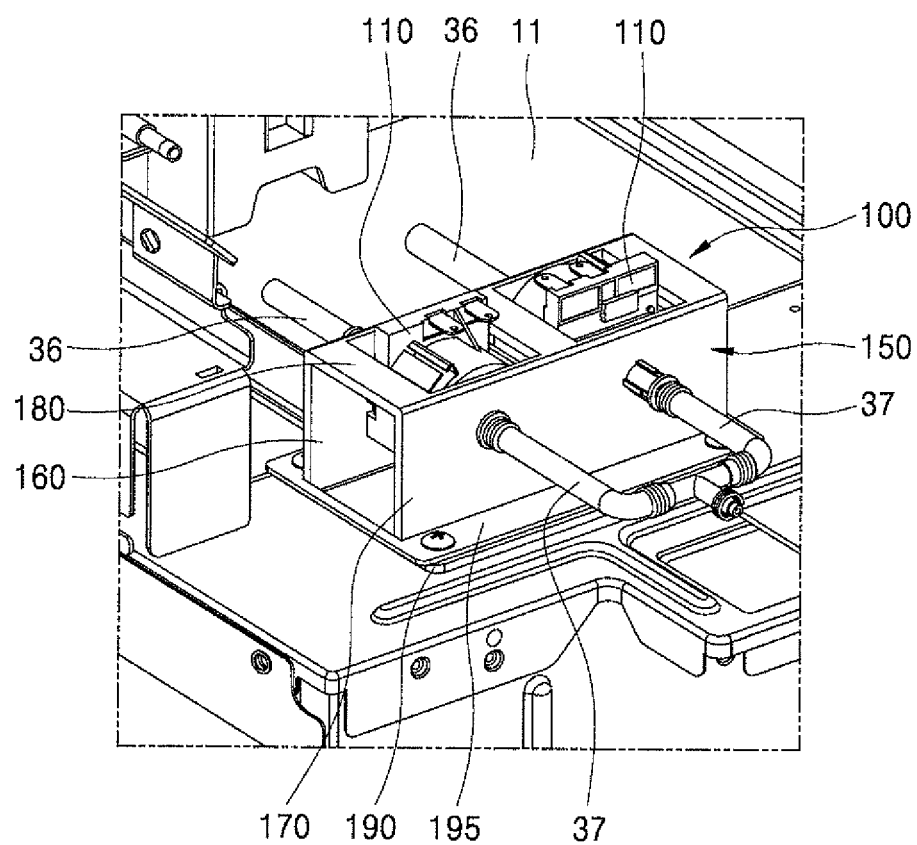
FIG. 6 is an enlarged view of portion "VI" in FIG. 5.
Figure 7:
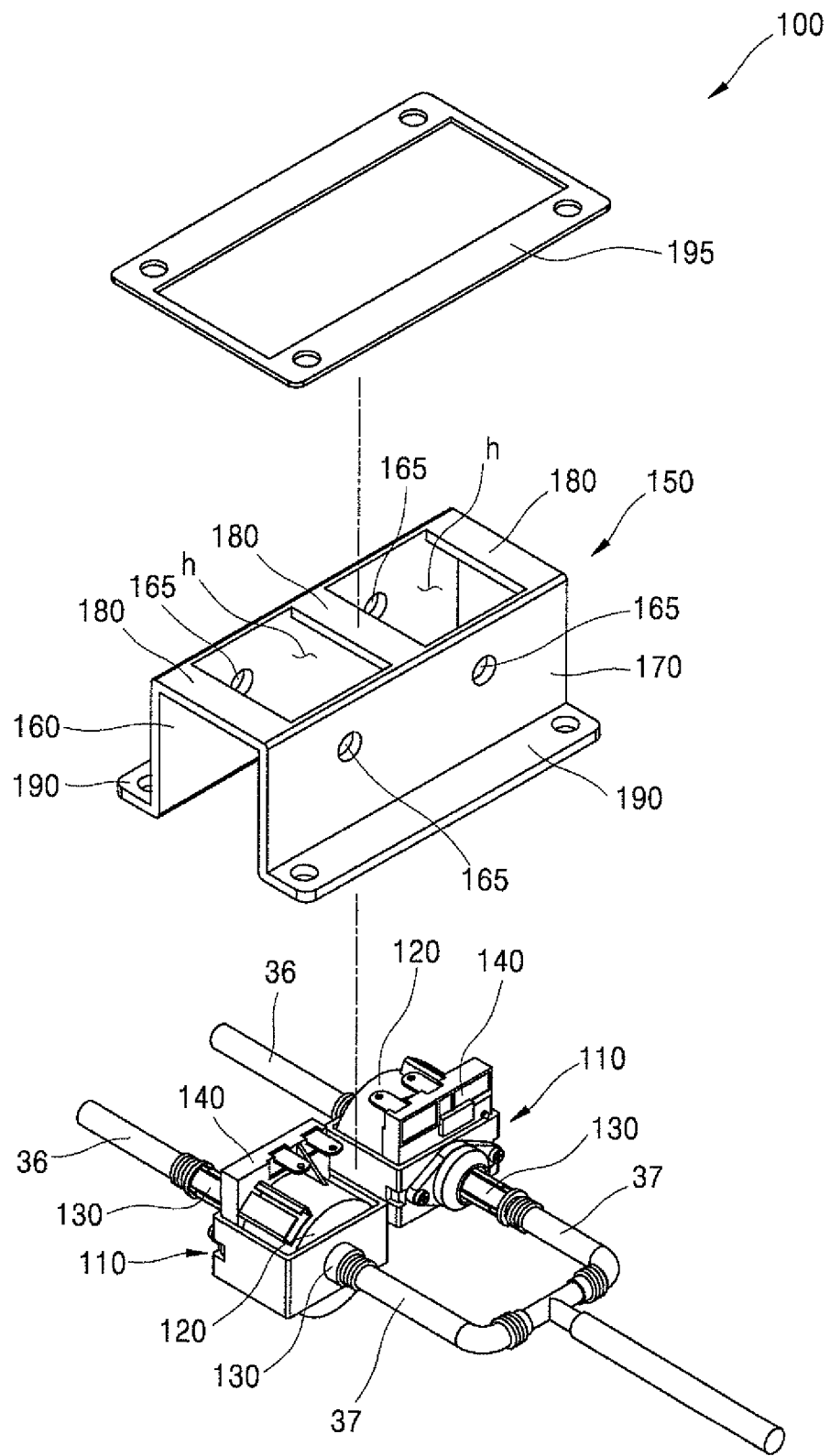
FIG. 7 is an exploded perspective view of a pump assembly shown in FIG. 6.
Figure 8:
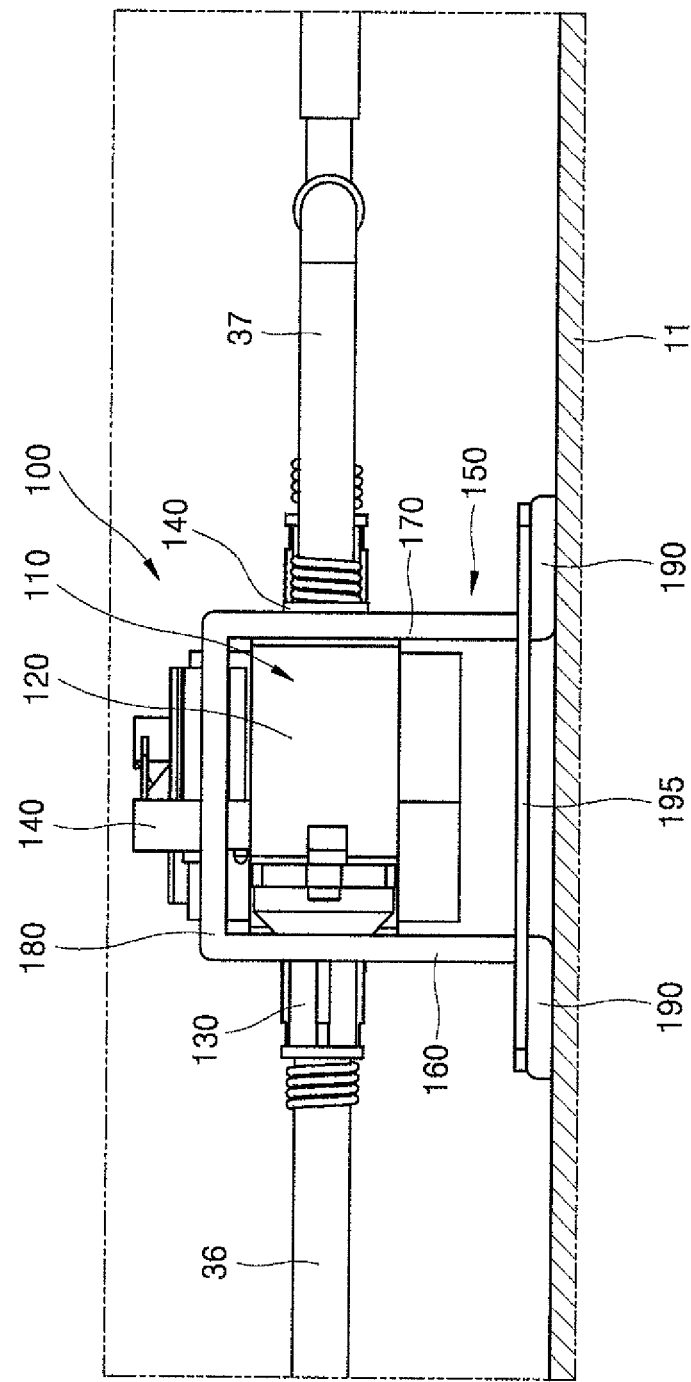
FIG. 8 is a side view of the pump assembly shown in FIG. 7.

FIG. 6 is an enlarged view of portion "VI" in FIG. 5. FIG. 7 is an exploded perspective view of a pump assembly shown in FIG. 6. FIG. 8 is a side view of a pump assembly shown in FIG. 7.

Referring to FIGS. 6 to 8, according to an embodiment of the present disclosure, a pump assembly 100 includes a pump 110 and a supporting member 150.

The pump 110 may include a pump main body 120 and coupling shaft 130. The pump main body 120 has a length extending in a first direction, a width extending in a second direction, and a height extending in a third direction. In one example the pump main body 120 is circular/cylindrical and the first direction extends along the center axis of the circular/cylindrical pump main body 120. In the present embodiment, the first direction is a front and rear direction, and the second direction is a lateral direction (radial direction), and the third direction is a vertical direction. The directions also relate to the orientation of the oven. So at least the third direction (vertical) is vertical to the assembly direction of the oven, i.e. vertical to the floor. The first and second directions are horizontal directions. The first and second directions are perpendicular to each other. In the embodiments shown in the figures the pump 110 is installed in front rear direction of the oven, however the central axis of the pump (first direction) could be also extend along the left right direction (lateral) of the oven.

The pump main body 120 has a substantially laid cylindrical shape. The pump main body 120 has a pump component to pump water introduced through the coupling shaft 130 provided at one side in the first direction, that is, forward, to the coupling shaft 130 provided at the other side in the second direction, that is, rearward.

The coupling shaft 130 protrudes from the pump main body 120 at one side and the other side in the first direction. A center of the pump main body 120, the coupling shaft 130 provided at one side in the first direction, and the coupling shaft 130 provided at the other side in the first direction may be disposed in a straight line.

The coupling shaft 130 provided at one side in the first direction is coupled to the coupling pipe 36 connected to the water supply device 35. The coupling shaft 130 provided at the other side in the first direction is connected to the connection pipe 37 connected to the water tank 32 of the Steam generator 31.

The pump 110 that has the pump main body 120 and the coupling shaft 130 is provided between the water supply device 35 and the Steam generator 31 connected to each other through the connection pipes 36 and 37 and functions to pump the water in the water supply device 35 to the Steam generator 31.

In this embodiment as illustrated in FIGS. 5, 6 and 7 a pair of pumps 110 is installed, wherein the two pumps 110 are spaced apart from each other by a predetermined interval along the second direction or between the two pump main bodies. Alternatively, the pump assembly 100 may include only one pump 110, or three or more pumps 110. The number of the pumps 110 in the pump assembly 100 may be variously selected depending on a size and a capacity of each pump 110, an amount of supplied steam in the cooking appliance, and the like.

The pump assembly 100 is disposed in the electric chamber 20 located above the cavity 11. The supporting member 150 is provided to support such a pump assembly 100 on the upper surface of the cavity 11. The supporting member 150 may include a first supporter 160, a second supporter 170, and a third supporter 180.

The first supporter 160 has a surface that intersects the first direction. In the present embodiment, the first supporter 160 has a vertical surface located in front of the pump 110.

The first supporter 160 is disposed at one side in the first direction of the pump 110, that is, in front of the pump 110. The first supporter 160 defines a fitting hole 165. The first supporter 160 is coupled to the coupling shaft 130 provided at one side in the first direction. At this time, the first supporter 160 is coupled to the coupling shaft 130 in a manner in which the coupling shaft 130 is fitted to the fitting hole 165.

The second supporter 170 has a surface that also intersects the first direction. In this embodiment, the second supporter 170 has a vertical surface that blocks the rear of the pump 110. So the first and second supporter 160, 170 are arranged parallel to each other.

The second supporter 170 is disposed at the other side in the first direction of the pump 110, that is, rearward of the pump 110. The second supporter 170 defines a further fitting hole 165. The second supporter 170 is coupled to the coupling shaft 130 provided at the other side in the first direction. At this time, the coupling between the second supporter 170 and the coupling shaft 130 is performed in a manner in which the coupling shaft 130 is fitted into the further fitting hole 165.

According to the present embodiment, the pump 110 is provided in a manner in which a center of the pump main body 120, the coupling shaft 130 provided at one side in the first direction, and the coupling shaft 130 provided at the other side in the first direction are disposed in the straight line. The pump 110 is coupled to the first supporter 160 and the second supporter 170. The pump 110 is rotating its center axis extending along the coupling shaft 130.

The fitting hole 165 is disposed at a position such that a separation space may be formed between the pump 110 and the installation target surface when the two sides of the coupling shaft 130 are fitted to the opposing fitting holes 165 and are coupled to the first supporter 160 and the second supporter 170, respectively. In the present embodiment, the installation target surface is an upper surface of the cavity 11. Further, the pump 110 coupled to the first supporter 160 and the second supporter 170 is coupled to the supporting member 150 in such a manner that the pump 110 is suspended from the supporting member 150 to be spaced apart from the upper surface of the cavity 11.

The third supporter 180 is disposed at a side opposing the installation target surface and extends from front side and the rear side of the pump main body 120 in the first direction of the pump 110, respectively. The third supporter 180 connects the first supporter 160 and the second supporter 170. The third supporter 180 may have a certain width extending in the second direction (lateral). There may be one or more third supporters 180 for connecting the first and the second supporter 160, 170.

In this embodiment, the plurality of pumps 110 are spaced apart from one another by predetermined intervals along the second direction. Accordingly, the third supporter 180 is disposed at both sides in the second direction of the pump 110, of the plurality of pumps, and among the pumps 110.

For example, when a pair of pumps 110 is disposed in the pump assembly 100 along the second direction, the third supporter 180 may be disposed at one side in the second direction of the pumps 110 and the other side in the second direction of the pumps 110, and between the pumps 110 may be disposed, that is, three third supporters 180 may be disposed.

In this embodiment, the third supporter 180 has a surface that connects an upper end of the first supporter 160 and an upper end of the second supporter 170. However, the third supporter 180 does not necessarily have to be connected to the upper ends of the first supporter 160 and the second supporter 170. As another example, the third supporter 180 may be connected to sides of the first supporter 160 and the second supporter 170. As another example, the third supporter 180 may be connected between the upper end and/or the lower end of the first supporter 160 and/or the second supporter 170.

Meanwhile, the pump 110 may further include a protrusion 140. The protrusion 140 protrudes upwardly or outside of a rotation range (outside the cylindrical body circumference) of the pump main body 120 in the third direction. The third supporter 180 is preferably disposed at a height from the installation target surface within the rotation range of an outermost portion of the protrusion 140. i.e. the third supporter is lower than highest dimension of the cylindrical body circumference of the pump main body 120, as shown in FIG. 8. Thus, the height of the protrusion 140 is higher than the height of the third supporter. The pump main body 120 and the protrusion 140 may rotate due to the movement of an impeller inside the pump main body 120 about the coupling shaft 130 as a center axis. As the third supporter 180 is lower in its height than the height of the protrusion 140, the unintentional rotation movement of the protrusion is blocked by the third supporter 180. Preferably, the first and second supporter 160 and 170 are connected with each other by two third supporters 180 forming an opening h therebetween. The protrusion 140 is extending through the opening to thereby block the rotation movement of the protrusion 140 and thereby also the rotation movement of the pump main body 120.

In this case, in the pump assembly 100, a pair of pumps 110 is accommodated in an inner space of the supporting member 150, and a pair of opening holes h is disposed in the second direction on the upper surface of the supporting member 150, and the protrusion 140 of each pump 110 protrudes upward through the opening hole h.

According to the present embodiment, viewed from side, in the supporting member 150, the first supporter 160, the second supporter 170, and the third supporter 180 have "Π" shape (inversed U shape) and connect to one another.

The first supporter 160, the second supporter 170, and the third supporter 180 are flexibly provided. That is, the first supporter 160, the second supporter 170, and the third supporter 180 are provided to be bent or stretched to some extent in the first direction, the second direction and the third direction, respectively. In this embodiment, the first supporter 160, the second supporter 170, and the third supporter 180 are made of a flexible material, for example soft and flexible rubber or soft and flexible silicon and are integrally formed.

Further, the first supporter 160, the second supporter 170, and the third supporter 180 are made of a soft material rather than a hard or rigid material. At this time, the first supporter 160, the second supporter 170, and the third supporter 180 are made of the soft material and may be preferably made of a material that may sufficiently support the pump 110 when the shape thereof is not deformed without an external impact.

Further, the supporting member 150 of the present embodiment may further include a coupling surface 190. The coupling surface 190 is connected to the first supporter 160 and the second supporter 170, respectively, and is coupled to an installation target surface on which the pump assembly 100 is installed, that is, an outer upper surface of the cavity 11. Specifically, the coupling surface 190 connected to the first supporter 160 has a horizontal surface that extends forward from a lower end of the first supporter 160. The coupling surface 190 connected to the second supporter 170 has a horizontal surface extending from the lower end of the second supporter 170 to the rear side thereof.

In this embodiment, the first supporter 160, the second supporter 170, the third supporter 180, and the coupling surface 190 are made of a flexible material and are integrally formed. For example, the supporting member 150 may be made of silicone having elasticity.

At least a portion of the first supporter 160 and the second supporter 170 are disposed between the third supporter 180 and the coupling surface 190 in the third direction (vertical). That is, the first supporter 160 and the second supporter 170 are the connecting surfaces that connect the third supporter 180 and the coupling surface 190.

Further, the first supporter 160, the second supporter 170, the third supporter 180, and the coupling surface 190 are made of a soft material rather than a hard material and are integrally formed. Accordingly, the supporting member 150 is provided so that the coupling surface 190 may be bent to one side or the other side in the first direction when the coupling surface 190 is coupled to the upper surface of the cavity 11.

In addition, the pump assembly 100 of the present embodiment may further include a supporting member 195. The supporting member 195 is coupled to the installation target surface with the coupling surface 190 therebetween to fix the coupling surface 190 to the installation target surface, that is, the outer upper surface of the cavity 11.

The supporting member 195 may have a rectangular plate shape having a hollow. The supporting member 195 may be fitted to an outside of the supporting member 150 from the top of the supporting member 150 and the supporting member 150 may be inserted into the supporting member 195 through the hollow of the supporting member 195. The supporting member 195 fitted to the outside of the supporting member 150 is coupled to the upper surface of the cavity 11 above the coupling surface 190.

The supporting member 195 may stably support the coupling surface 190 above the coupling surface 190 and may firmly fix the coupling surface 190 to the upper surface of the cavity 11. It is preferable that the supporting member 195 is made of metal having high strength.

Accordingly, the supporting member 150 may be freely bent to one side or the other side in the first direction, and may be firmly fixed to the upper surface of the cavity 11.

<Operation and Effect of Supporting Member>

Figure 9:
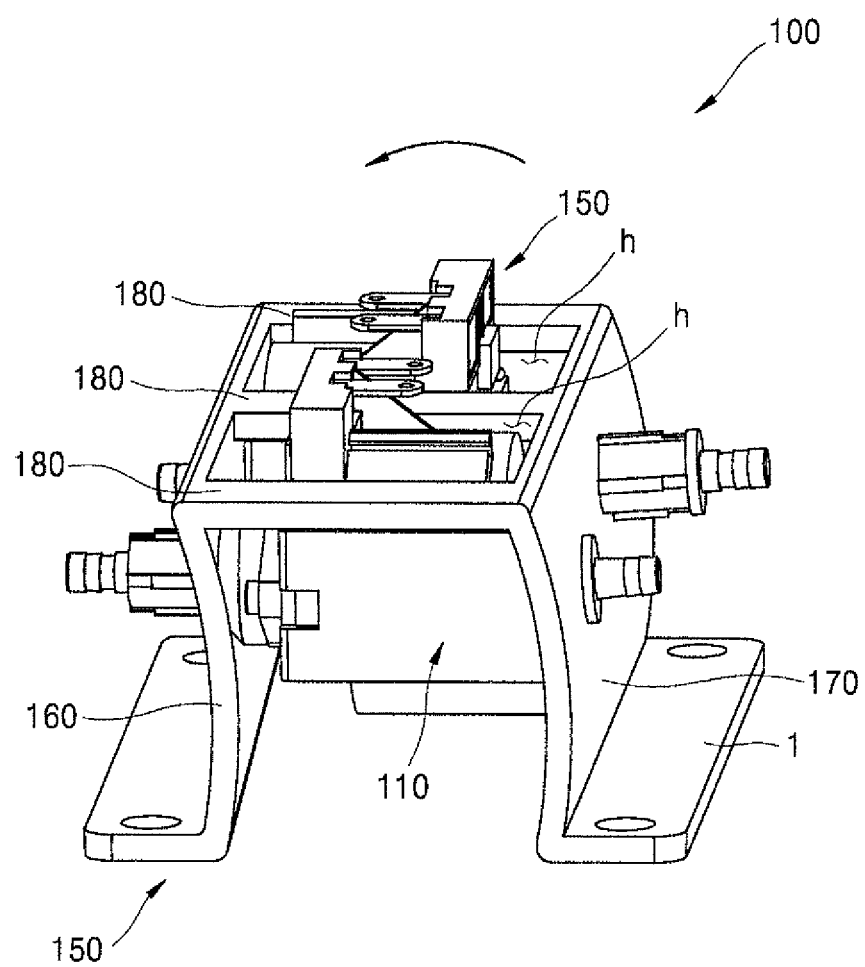
FIGS. 9 and 10 are front perspective views of forward and rearward movement of pumps in a pump assembly according to one embodiment.
Figure 10:
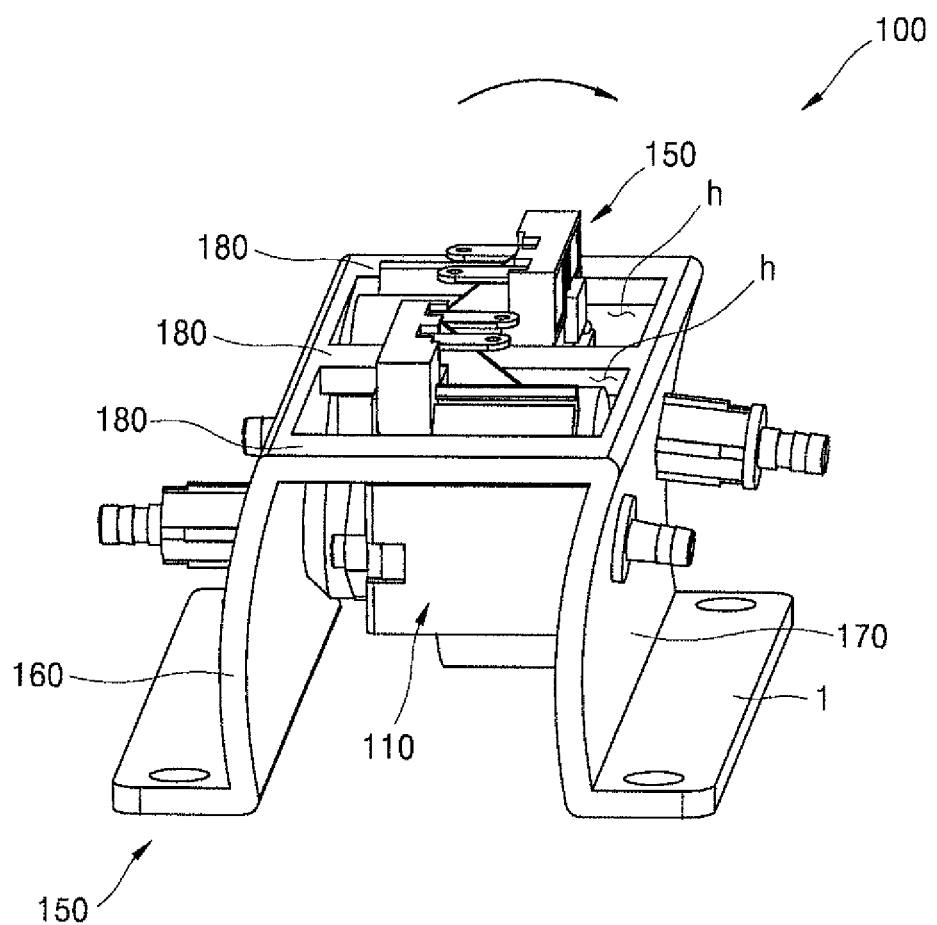
Figure 11:
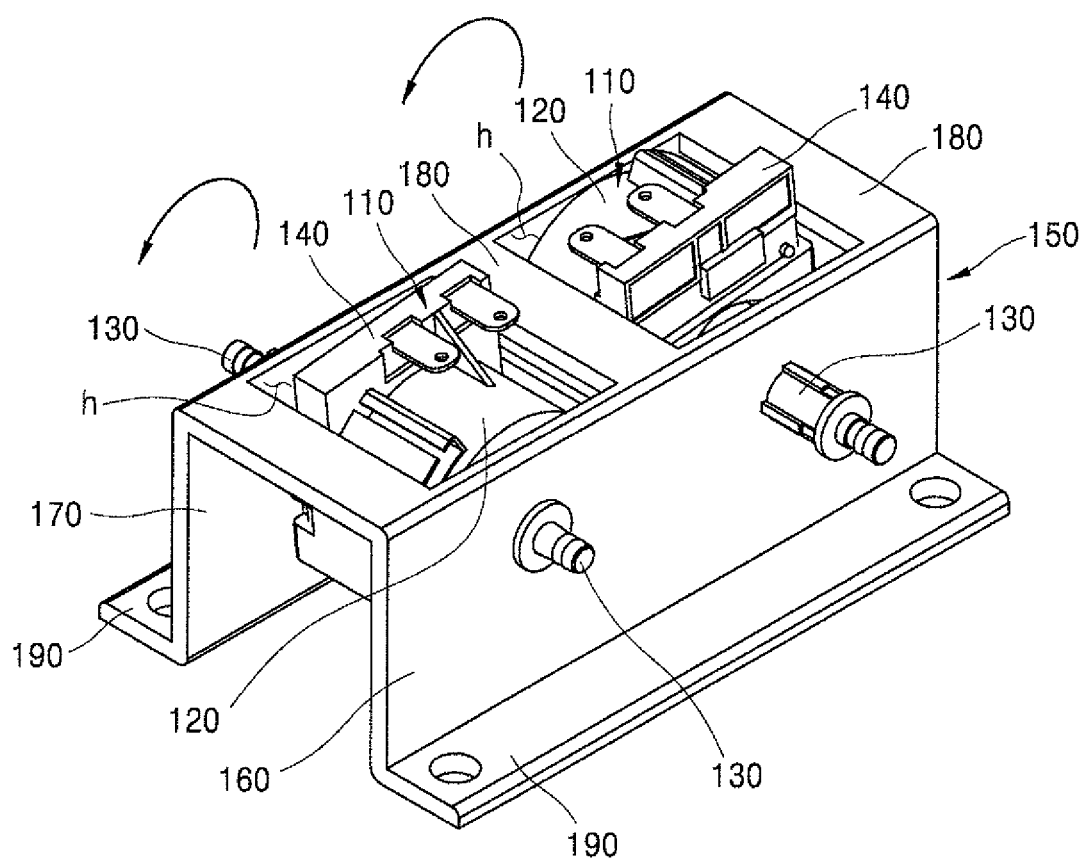
FIGS. 11 and 12 are side perspective views of lateral movement of pumps in a pump assembly according to an embodiment.
Figure 12:
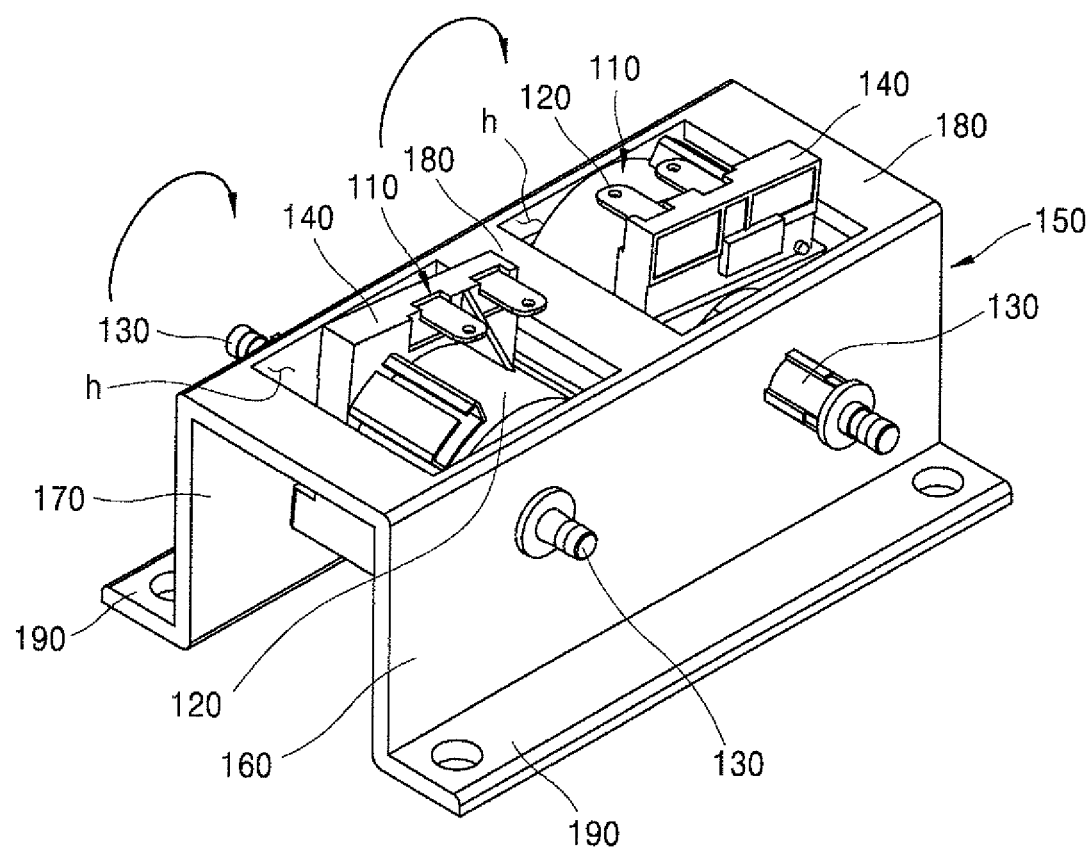

FIGS. 9 and 10 are front perspective views of lateral movement of pumps in a pump assembly according to an embodiment of the present disclosure. FIGS. 11 and 12 are side views of forward and rearward movement of pumps in a pump assembly according to an embodiment of the present disclosure.

Hereinafter, an operation and an effect of the pump assembly and the cooking appliance that has the pump assembly according to the embodiment of the present disclosure will be described with reference to FIGS. 3 to 6 and 9 to 12.

As shown in FIGS. 3 and 4, when the operation of a steam supply device 31 (steam generator) (see FIG. 4) is started to supply the steam into the cooking chamber 15 (see FIG. 3), the supply of water to the Steam generator 31 is provided by the water supply device 35 to allow to generate the steam in the steam generator 31. Further, the operation of the pump 110 is started to supply the water to the steam generator 31.

Referring to FIGS. 4 to 6, a pump 110 is provided between the connection pipes 36 and 37, and the pump 110 is operated to pump water of the water supply device 35 to the steam generator 31.

Such a pump 110 has a property of severe vibration and the pump may oscillate based on the vibration thereof during rotating operation of the pump.

The vibration of the pump 110 may be absorbed by the supporting member 150, as shown in FIGS. 9 and 10. According to the present embodiment, the pump 110 is supported above the cavity 11 (see FIG. 8) wherein the pump 110 is suspended from the supporting member 150.

Further, the supporting member 150 includes the first supporter 160 and the second supporter 170 which are made of a flexible material and are integrally formed and may be bent or stretched to some extent in the first direction, the second direction, and the third direction. The supporting member 150 may be made of elastic material that is returned back to its original state after the supporting member 150 is bent or stretched.

Therefore, even when the vibration of the pump 110 is generated and a force to move the pump 110 in at least one of the first direction, the second direction, and the third direction is generated, such a force may be absorbed by the supporting member 150.

For example, when a force to move the pump 110 to one side in the first direction, that is, forward, is applied to the supporting member 150 due to the vibration of the pump 110, the supporting member 150 may be bent forward and may absorb such a force. To the contrary, when a force to move the pump 110 to the other side in the first direction, that is, the rear side, is applied to the supporting member 150 due to the vibration of the pump 110, the supporting member 150 may be bent rearward and may absorb such a force.

As described above, the supporting member 150 that has absorbed the force applied by the pump 110 may be returned to its original state so that the supporting member 150 may stably fix and support the pump 110 to the designated position.

Further, as the supporting member 150 is made of a soft material, even when collision occurs between the pump 110 and the supporting member 150, the impact may be absorbed by the supporting member 150. That is, even when the collision occurs between the pump 110 and the supporting member 150 due to the vibration of the pump 110, impact is not applied to the pump 110 or the supporting member 150, or a collision sound is not generated.

Further, as the pump 110 is supported by the supporting member 150 when the pump 110 is sufficiently spaced apart from the upper surface of the cavity 11, there is less fear that collision between the cavity 11 and the pump 110 may occur.

Further, the pump 110 may be influenced by the rotational force of the impeller inside of the pump 110, so that a force to rotate the pump 110 is applied to the pump 110 to generate the rotation of the pump 110.

As shown in FIGS. 11 and 12, the rotation of the pump 110 may be blocked by the supporting member 150. According to the present embodiment, the pump 110 is supported by the supporting member 150 in such a manner that is accommodated in the inner space of the supporting member 150. At this time, each protrusion 140 of the pump 110 protrudes upward through an opening hole h formed between the third supporters 180 at an upper portion of the supporting member 150.

The pump 110 may be rotated about the coupling shaft 130 extending in the first direction as a center axis and the protrusion 140 disposed at the outermost position of the rotation range of the pump 110 may be coupled to the coupling shaft 130 as the center axis.

The pump 110, more specifically, the third supporter 180 disposed at both sides in the second direction of the protrusion 140, respectively, is disposed within the rotation range of the outermost portion of the protrusion 140. The third supporter 180 forms a blocking wall that prevents the protrusion 140 from moving at both sides in the second direction of the protrusion 140, that is, at the left and right sides of the protrusion 140.

Further, the movement of the protrusion 140 is prevented by the third supporter 180, which is integrated with the pump 110, even when the force to rotate the pump 110 is applied to the pump 110 and the pump 110 is about to rotate.

For example, as shown in FIG. 11, when the pump 110 is about to rotate in a direction toward one side in the second direction, interference between the third supporter 180 disposed at one side in the second direction and the protrusion 140 is generated. As a result, further movement of the protrusion 140 toward one side in the second direction is prevented by the third supporter 180, thereby preventing the rotation of the pump 110.

Further, as shown in FIG. 12, when the pump 110 is about to rotate in a direction toward the other side in the second direction, interference between the third supporter 180 disposed at the other side in the second direction and the protrusion 140 is generated. As a result, further movement of the protrusion 140 toward the other side in the second direction is prevented by the third supporter 180, thereby preventing the rotation of the pump 110.

Further, as the supporting member 150 including the third supporter 180 is made of the soft material, even when the collision occurs between the pump 110 and the third supporter 180, the impact may be absorbed by the supporting member 150. That is, even when the collision occurs between the pump 110 and the supporting member 150 due to the force to rotate the pump 110, the impact is not applied to the pump 110 or the supporting member 150 or the collision sound is not generated.

As described above, the pump assembly 100 and the cooking appliance that has the pump assembly 100 of the present embodiment may effectively absorb the vibration of the pump 110 while stably maintaining the pump 110 at the designated position.

According to the present embodiment, the pump assembly 100 and the cooking appliance that has the pump assembly 100 may stably suppress and prevent the influence of the vibration of the pump 110 and the rotation of the pump 110, thereby effectively preventing the collision between the cavity 11 or the peripheral parts thereof and the pump 110, and the noise caused by the collision and the disengagement of the pump 110 from occurring.

The present disclosure provides a pump assembly that has an improved structure so that a pump may be stably fixed and a cooking appliance that has the pump assembly.

In order to achieve the above object, according to an embodiment of the present disclosure, the pump assembly is configured such that a pump is supported by a supporting member, and at least a portion of the supporting member is flexibly provided.

Further, according to another embodiment of the present disclosure, a water supply device is provided in the cooking appliance, and a pump assembly in which the pump is supported by a supporting member at least a portion of which is flexibly provided is connected to a connection pipe to supply water to the water supply device.

The object is solved by the features of the independent claims. Preferred embodiments are given in the dependent claims.

According to an aspect of the present disclosure, there is provided a pump assembly including: a pump including a pump main body that has a length extending in a first direction, a width extending in a second direction, and a height extending in a third direction, and a coupling shaft that protrudes from the pump main body at one side and the other side in the first direction, respectively; a first supporter that has a surface intersecting the first direction and is disposed at one side in the first direction of the pump and is coupled to the coupling shaft provided at one side in the first direction; a second supporter that has a surface interesting the first direction and is disposed at the other side in the first direction of the first supporter with the pump therebetween and is coupled to the coupling shaft provided at the other side in the second direction; and a third supporter that is disposed at one side and the other side in the second direction of the pump, respectively and connects the first supporter and the second supporter across the first supporter and the second supporter, and the first supporter and the second supporter, and the third supporter are flexibly provided.

According to the pump assembly having such a configuration, vibration of the pump may be effectively absorbed, while the pump may be stably maintained at a designated position.

Further, it is preferable that the pump assembly further includes a coupling surface connected to the first supporter and the second supporter, respectively.

Preferably, the coupling surface is coupled to an installation target surface on which the pump assembly is installed.

Preferably, at least a portion of the first supporter and the second supporter is disposed between the third supporter and the coupling surface in the third direction.

Preferably, the first supporter, the second supporter, the third supporter, and the coupling surface are made of a flexible material and are integrally formed.

The pump assembly having the above-described structure may stably suppress and prevent an influence of the vibration of the pump and a rotation of the pump, thereby effectively preventing occurrence of collision between the cavity or the peripheral parts thereof and the pump and noise caused by the collision, and a disengagement of the pump.

Further, it is preferable that the present disclosure further includes a supporting member which is coupled to the installation target surface with the coupling surface therebetween and fixes the coupling surface to the installation target surface.

Through this configuration, there is an advantage that the supporting member may be freely bent and may be fixed firmly to the installation target surface.

Further, according to another aspect of the present disclosure, a cooking appliance includes a cavity that defines a cooking chamber; a water supply device installed outside of the cavity; a connection pipe connected to the water supply device; and a pump assembly installed outside of the cavity and connected to the connection pipe, and the pump assembly includes a pump; and a supporting member that is made of a flexible material and couples the pump to the cavity.

Preferably, the supporting member may couple the pump to an upper surface of cavity.

Preferably, the first supporter and the second supporter may each include a fitting hole into which the coupling shaft is fitted.

Preferably, the pump may be coupled to the first supporter and the second supporter so that the pump is rotatable about the coupling shaft as a center axis.

Preferably, the fitting hole is disposed at a position in which a separation space may be formed between the pump and the installation target surface when the coupling shaft is fitted to the fitting hole.

Preferably, the pump may further comprise a protrusion that protrudes upwardly from the pump main body.

Preferably, the third supporter may be disposed lower than a rotation range of an outermost portion of the protrusion.

Preferably, a plurality of pumps may be disposed to be spaced apart from one another at a predetermined interval along the second direction.

Preferably, the third supporter may be disposed at both sides in the second direction of the plurality of pumps and/or between the pumps.

Preferably, the first and second supporter may be connected by at least two third supporters above the pump main body.

Preferably, the two third supporters extending in the first direction form an opening between the two third supporters.

Preferably, the protrusion protruding upwardly from the pump main body may extend through the opening.

The cooking appliance having such a configuration stably suppresses and prevents the influence of the vibration of the pump and the rotation of the pump which may be generated during the operation of the pump provided to supply water to generate steam, thereby making the supply of the steam smooth, while effectively suppressing occurrence of a problem such as noise, breakage of parts, disengagement of the pump, and the like.

According to the present disclosure, in the pump assembly and the cooking appliance that has the pump assembly, the vibration of the pump may be effectively absorbed while the pump may be stably maintained at the designated position.

Further, the present disclosure may stably suppress and prevent the influence of the vibration of the pump and the rotation of the pump, thereby effectively preventing the occurrence of collision between the cavity or the peripheral parts thereof and the pump, and the noise caused by the collision, and the disengagement of the pump.

While the present disclosure has been described with reference to exemplary embodiments shown in the figures, it is merely illustrative, and it will be understood by the skilled person in the art that various modifications and equivalent other embodiments may be made. Thus, a true technical scope of the present disclosure should be defined by the following claims.

DESCRIPTION OF SYMBOLS

10: Main body
11: Cavity
14: Front panel
15: Cooking chamber
16: Door
17: Handle
18: Convection heater
20: Electric chamber
30: Steam supply device
31: Steam generator
32: Water tank
33: Steam heater
35: Water supply device
36 and 37: Connection pipe
100: Pump assembly
110: Pump
120: Pump main body
130: Coupling shaft
140: Protrusion
150: Supporting member
160: First supporter
170: Second supporter
180: Third supporter
190: Coupling surface
195: Supporting member
h: Opening hole

What is claimed is:

1. A pump assembly, comprising:
    at least one pump comprising a pump main body having a length extending in a first direction, a width extending in a second direction, and a height extending in a third direction, and coupling shafts that protrude from the pump main body at a first side and a second side in the first direction, respectively;
    a first supporter having a surface intersecting the first direction and disposed at the first side in the first direction of the at least one pump, and coupled to the coupling shaft provided at the first side in the first direction;
    a second supporter having a surface intersecting the first direction and disposed at the second side in the first direction with the at least one pump between the first supporter and the second supporter, and coupled to the coupling shaft provided at the second side; and
    a third supporter disposed at a first side and a second side in the second direction of the at least one pump and connecting the first supporter and the second supporter, wherein at least one of the first supporter, the second supporter, or the third supporter is flexible, wherein the at least one pump further comprises a protrusion that protrudes outward of a rotation range of the pump main body, and wherein the third supporter is disposed within a rotation range of an outermost portion of the protrusion.

2. The pump assembly of claim 1, wherein the third supporter is flexible.

3. The pump assembly of claim 1, wherein the first supporter, the second supporter, and the third supporter are each made of a flexible material and are integrally formed.

4. The pump assembly of claim 1, further comprising coupling surfaces connected to the first supporter and the second supporter, respectively, and coupled to an installation target surface on which the pump assembly is installed, wherein at least a portion of each of the first supporter and the second supporter is disposed between the third supporter and the coupling surfaces in the third direction.

5. The pump assembly of claim 4, wherein the first supporter, the second supporter, the third supporter, and the coupling surfaces are each made of a flexible material and are integrally formed.

6. The pump assembly of claim 5, further comprising a support that is coupled to the installation target surface with the coupling surfaces therebetween and fixes the coupling surfaces to the installation target surface.

7. The pump assembly of claim 4, wherein the first supporter and the second supporter each includes a fitting hole into which the coupling shafts are rotatably fitted, and wherein the at least one pump is coupled to the first supporter and the second supporter so that the at least one pump is rotatable about the coupling shafts which function as a center axis.

8. The pump assembly of claim 7, wherein the fitting holes of the first supporter and the second supporter are disposed at a position at which a separation space is formed between the at least one pump and the installation target surface when the coupling shafts are fitted to the fitting holes.

9. The pump assembly of claim 7, wherein the at least one pump comprises a plurality of pumps disposed spaced apart from one another at predetermined intervals along the second direction, and wherein the third supporter is disposed at both sides in the second direction of the plurality of pumps and between the plurality of pumps.

10. A cooking appliance comprising the pump assembly of claim 1.

11. A cooking appliance, comprising:
    a cavity that defines a cooking chamber;
    a water supplier installed outside of the cavity;
    a connection pipe connected to the water supplier; and a pump assembly installed outside of the cavity and connected to the connection pipe, the pump assembly comprising:

at least one pump comprising a pump main body having a length extending in a first direction, a width extending in a second direction, and a height extending in a third direction, and coupling shafts that protrude from the pump main body at a first side and a second side in the first direction, respectively;

a first supporter having a surface intersecting the first direction and disposed at the first side in the first direction of the at least one pump and coupled to the coupling shaft at the first side in the first direction of the at least one pump;

a second supporter having a surface intersecting the first direction and disposed at the second side in the first direction with the at least one pump between the first supporter and the second supporter, and coupled to the coupling shaft provided at the second side; and a third supporter disposed at a first side and a second side in the second direction of the at least one pump and connecting the first supporter and the second supporter, and wherein the first supporter, the second supporter, and the third supporter are each flexible, wherein the at least one pump further comprises a protrusion that protrudes outward of a rotation range of the pump main body, and wherein the third supporter is disposed within a rotation range of an outermost portion of the protrusion.

12. The cooking appliance of claim 11, further comprising coupling surfaces connected to the first supporter and the second supporter, respectively, and coupled to an outer upper surface of the cavity, wherein at least a portion of each of the first supporter and the second supporter is disposed between the third supporter and the coupling surfaces in the third direction.

13. The cooking appliance of claim 12, wherein a fitting hole to which the coupling shaft is rotatably fitted is defined in each of the first supporter and the second supporter, and wherein the at least one pump is coupled to the first supporter and the second supporter to be rotatable about the coupling shafts which function as a center axis.

14. The cooking appliance of claim 13, wherein the fitting holes of the first supporter and the second supporter are disposed at a position at which a separation space is formed between the at least one pump and an outer upper surface of the cavity when the coupling shafts are fitted into the fitting holes.

15. A pump assembly, comprising:

a plurality of pumps each comprising a pump main body having a length extending in a first direction, a width extending in a second direction, and a height extending in a third direction, and coupling shafts that protrude from the pump main body at a first side and a second side in the first direction;

a first supporter that extends perpendicular to the first direction and disposed at the first side in the first direction of the plurality of pumps, and coupled to each coupling shaft provided at the first side in the first direction;

a second supporter that extends perpendicular to the first direction and disposed at the second side in the first direction with the plurality of pumps between the first supporter and the second supporter, and coupled to each coupling shaft provided at the second side; and a third supporter disposed at a first side and a second side in the second direction of the plurality of pumps and connecting the first supporter and the second supporter, wherein at least one of the first supporter, the second supporter, or the third supporter is made of a soft and flexible material, wherein the plurality of pumps further each comprises a protrusion that protrudes outward of a rotation range of the pump main body, and wherein the third supporter is disposed within a rotation range of an outermost portion of the protrusion.

16. The pump assembly of claim 15, wherein the first supporter, the second supporter, and the third supporter are each made of a soft and flexible material and are integrally formed.

17. The pump assembly of claim 15, wherein the soft and flexible material is silicon.

18. The pump assembly of claim 15, wherein the first supporter and the second supporter each defines a plurality of fitting holes into which each coupling shaft is rotatably fitted, and wherein each pump is coupled to the first supporter and the second supporter so that the plurality of pumps is rotatable about the coupling shafts which function as a center axis.

19. A cooking appliance comprising the pump assembly of claim 15.

* * * * *